US011192732B2

(12) United States Patent
Campbell et al.

(10) Patent No.: US 11,192,732 B2
(45) Date of Patent: Dec. 7, 2021

(54) CARGO TRANSFER SYSTEM USING A PALLETIZED RACK (71) Applicant: American Refrigerated Express, Inc., Indianapolis, IN (US)

(72) Inventors: Thomas Campbell, St. Louis, MO (US); Art Shoener, Carmel, IN (US)

(73) Assignee: American Refrigerated Express, Inc., Leawood, KS (US)

(*) Notice: Subject to any disclaimer, the term of this patent is extended or adjusted under 35 U.S.C. 154(b) by 0 days.

(21) Appl. No.: 16/800,872

(22) Filed: Feb. 25, 2020

(65) Prior Publication Data
US 2020/0189864 A1 Jun. 18, 2020

Related U.S. Application Data (60) Continuation of application No. 16/258,332, filed on Jan. 25, 2019, now Pat. No. 10,597,241, which is a division of application No. 14/199,150, filed on Mar. 6, 2014, now Pat. No. 10,221,022, which is a continuation of application No. 12/881,779, filed on Sep. 14, 2010, now Pat. No. 8,702,366, which is a continuation of application No. 11/985,493, filed on Nov. 15, 2007, now abandoned, which is a continuation-in-part of application No. 10/775,258, filed on Feb. 10, 2004, now abandoned.

(51) Int. Cl.
*B65G 67/04* (2006.01)
*B65G 63/00* (2006.01)
*B65G 63/02* (2006.01)

(52) U.S. Cl.
CPC ........... *B65G 67/04* (2013.01); *B65G 63/002* (2013.01); *B65G 63/022* (2013.01)

(58) Field of Classification Search
CPC ...... B65G 39/025; B65G 67/04; B65G 67/10; B65G 63/002; B65G 63/022; B65G 2201/0267; B65G 2201/0285; B65G 2201/0258; B61D 45/00
USPC ......................................................... 414/788
See application file for complete search history.

(56) References Cited

U.S. PATENT DOCUMENTS 2,577,276 A * 12/1951 Saul, Jr. ............... A47B 47/027
    108/110
2,986,284 A * 5/1961 Colbert ................ A47B 81/007
    211/134
3,026,817 A * 3/1962 Sebastian ............... B65G 13/00
    104/135

(Continued)

*Primary Examiner* — Glenn F Myers
(74) *Attorney, Agent, or Firm* — Erickson Kernell IP, LLC (57) ABSTRACT A system, method, and apparatus for palletizing cargo on a rack for shipment are provided. The system generally includes a tiered rack having a base tier, a support framework extending from the base tier, and a second tier adjustably attached to the support framework. The system may further include a plurality of lower frame support members positioned longitudinally across the bottom of the base tier, and a plurality of pneumatically actuated rollers spaced to cooperatively engage the plurality of lower frame support members, the rollers being selectively extendable from a plurality of raised tracks positioned longitudinally along a floor of the railcar, where the rollers are configured to pneumatically extend past an upper surface of the track when actuated and allow for linear motion thereover.

9 Claims, 9 Drawing Sheets

(56) References Cited

U.S. PATENT DOCUMENTS

| | | | | |
|---|---|---|---|---|
| 3,093,092 A | * | 6/1963 | Martin | B61D 3/20 |
| | | | | 410/85 |
| 3,147,738 A | * | 9/1964 | Theilig | A01K 41/065 |
| | | | | 119/322 |
| 3,504,636 A | * | 4/1970 | Alder | B61D 47/00 |
| | | | | 410/67 |
| 3,672,529 A | * | 6/1972 | Feddersen | B65D 88/14 |
| | | | | 220/1.5 |
| 3,709,450 A | * | 1/1973 | Watts | B64D 9/00 |
| | | | | 410/79 |
| 3,737,047 A | * | 6/1973 | Ruth | B65G 1/10 |
| | | | | 211/162 |
| 3,768,416 A | * | 10/1973 | Juechter | B65G 13/00 |
| | | | | 104/135 |
| 4,426,051 A | * | 1/1984 | Banks | B64D 1/10 |
| | | | | 244/137.3 |
| 4,966,515 A | * | 10/1990 | Van Niekerk | B65G 67/20 |
| | | | | 414/528 |
| 5,464,086 A | * | 11/1995 | Coelln | B65G 39/025 |
| | | | | 193/35 B |
| 5,524,776 A | * | 6/1996 | Hall | B65G 1/026 |
| | | | | 211/151 |
| 5,533,604 A | * | 7/1996 | Brierton | B65G 39/025 |
| | | | | 193/35 MD |

\* cited by examiner

CARGO TRANSFER SYSTEM USING A PALLETIZED RACK

CROSS REFERENCE TO RELATED APPLICATIONS

This application is a continuation of application Ser. No. 16/258,332, filed Jan. 25, 2019, which is a divisional of application Ser. No. 14/199,150, filed Mar. 6, 2014 (now U.S. Pat. No. 10,221,022), which is a continuation of application Ser. No. 12/881,779, filed Sep. 14, 2010 (now U.S. Pat. No. 8,702,366), which is a continuation of application Ser. No. 11/985,493, filed Nov. 15, 2007 (now abandoned), which is a continuation-in-part of application Ser. No. 10/775,258, filed Feb. 10, 2004 (now abandoned), all titled CARGO TRANSFER SYSTEM USING A PALLETIZED RACK.

BACKGROUND

1. Field of the Invention

The present invention relates to a cargo transfer apparatus, system, and method, each of which uses a tiered palletized rack to transport cargo or freight. Particularly, the present invention is directed to an improved apparatus, system, and method for the transport of cargo between road and rail using a tiered palletized rack that allows for efficient loading and unloading of cargo into railcars without a forklift entering into the railcar.

2. Description of Related Art

The use of railways to transport cargo has long been known in the art. Railway transport has the advantage that large amounts of cargo may be transferred on more or less direct routes between rail served origin and destination locations. This has long provided shippers with lower transportation costs due to the economies scale rail service provides over road transportation alternatives.

However, a challenge with conventional rail transportation methods is that the current system lacks an efficient method for loading and safely transporting palletized freight. One method involves loading pallets into a shipping container, such as the standard 20 feet and 40 feet sea containers, and then loading the sea container onto a flat car for rail transport. However, this method obviously has the disadvantage of additional loading and unloading efforts associated with the container. More often than not, palletized freight is transported in boxcars. However, this method also provides challenges in that the process of loading and unloading boxcars with palletized freight is not efficient and often causes damage to the boxcars or the freight as a result of the small area available to maneuver the pallet loading equipment, i.e., forklifts.

Another area where palletized freight presents challenges for transportation is in the refrigerated freight area. Refrigerated freight is often perishable, fragile, and difficult to stack for efficient use of space in railcars. Additionally, refrigerated freight requires particular spacing for shipment to allow for refrigerated air to be circulated around the freight to prevent hot spots, spoilage, etc. These requirements present substantial challenges to the conventional method of simply loading pallets into a railcar with a forklift and placing them on the floor of the railcar. One challenge in particular, aside from those noted above with regard to the confined space available for a forklift to operate in a railcar, is the efficient use of space for perishable items in refrigerated railcars, as perishable freight often cannot be double stacked. Thus, more than half of the available space in a refrigerated railcar (the space above the pallets set on the floor of the railcar) goes unused.

Double stacking of palletized loads may occur when the products are lighter weight and can be stacked without crushing or damaging the first tier of products or the products are not susceptible to weight related damage. In some instances, the products are crated or reinforced in some manner to provide the necessary support for two-tier loading. Another variation employs the use of a second tier platform, which is placed over the first tier of pallets after they have been loaded. Typically, two pallets of products are placed side by side at one end of the car. Then, second tier platform sections are placed over the first tier spanning the distance between the two sidewalls of the car. These sections are supported by structural members extending to the floor at the sidewalls of the car or attached directly to the sidewalls, thus eliminating any pressure on the bottom loads. This then enables a second tier of pallets to be loaded on the platform constructed above the first two pallets of products. However, current stacking methods risk damage to the cargo, either through human error where hand-stacking is involved, or through damage caused by the use of fork trucks to stack the cargo into the railcar.

The second tier sections utilized to span the distance between the side-walls may include simple 2'×10' lumber, common metal floor grating, or more elaborate designs involving drop down sections which fold against the side of the car when not in use. Most of the perishable products shipped in thermally controlled railcars are hand-stacked to maintain uniform temperature control around the product. These products are also often sensitive to weight limitations due to the delicate nature of the products and packaging involved. An exception would be the shipment of frozen products where air circulation is not as critical and double stacking of pallets may be feasible. This is because the frozen products are less susceptible to load crushing. However, some palletized loads are being shipped either in a single-tier configuration inside the refrigerated freight car or by double-tiering the loads as previously discussed. This occurs when temperature control around the product is less sensitive (i.e., frozen products) or when load crushing is not an issue with the products involved. Cardboard slip-sheets are often used in place of common wood pallets to minimize load damage and minimize expense to the shipper. Pallets constructed of other materials and heights may also be used as required.

Two tier loading is accomplished in the same manner as described previously with palletized or slip sheeted loads handled individually in and out of the freight car with the use of manually operated fork trucks. However, this system has the disadvantages previously discussed. Thus, a need exists for an efficient system for palletized loading of a railcar that is adaptable to refrigerated or dry cargo, makes efficient use of the space in the railcar, and facilitates loading and unloading without damaging the cargo.

SUMMARY OF THE INVENTION

The purpose and advantages of the present invention will be set forth in and apparent from the description that follows, as well as will be learned by practice of the invention. Additional advantages of the invention may be realized or obtained by the methods and systems particularly pointed out in the written description and claims hereof, as well as from the appended drawings.

It is an object of embodiments of the invention to provide an efficient centralized cargo transfer system. It is a further object of embodiments of the invention to provide an apparatus that can be used to facilitate the transfer of cargo on and off railcars. It is a further object of the invention to provide a system to facilitate the transfer of palletized cargo on and off of railcars without damage to the cargo. A particular object of embodiments of the invention is a palletized cargo system that facilitates loading and unloading without the need for a fork truck to handle individual cargo containers. These and other objects may be achieved through embodiments of the invention as described herein.

In one exemplary embodiment of the invention, a system for loading a railcar may be provided. The exemplary system may generally include a tiered rack having a base tier, a support framework extending upward from the base tier, and a second tier adjustably attached to the support framework above the first tier. The system may further include a plurality of lower frame support members positioned longitudinally across the bottom of the base tier, and a plurality of pneumatically actuated rollers spaced to cooperatively engage the plurality of lower frame support members, the rollers being selectively extendable from a plurality of raised tracks positioned longitudinally along a floor of the railcar, where the rollers are configured to pneumatically extend past an upper surface of the track when actuated.

In another exemplary embodiment of the invention, a method for bulk loading a railcar without a forklift entering the railcar may be provided. The method may generally include bulk loading a two tiered rack with cargo, transporting the loaded two tiered rack through a loading opening of a railcar with a forklift; and setting the loaded two tiered rack onto a plurality of raised tracks positioned on a floor of the railcar with the forklift, while supporting wheels of the forklift remain outside of the railcar. The exemplary method may further include moving the loaded two-tiered rack from the loading opening to a position proximate an end of the railcar, the moving being conducted on a plurality of pneumatically extendable rollers extending from the plurality of raised tracks. The method may further include securing the loaded two-tiered rack in the railcar by retracting the extendable rollers to allow the loaded two tiered rack to statically rest on the raised tracks for transport.

In another exemplary embodiment of the invention, an adjustable rack for supporting multiple tiers of cargo in a railcar may be provided. The exemplary adjustable rack may include a rigid structurally supporting base member having fork pockets on first and second sides thereof, and an upright support framework extending upward from the base member. A second tier may be adjustably attached to the support framework above the base member, and an air permeable wire mesh cargo support member may be positioned to cover an upper surface of the second tier and an upper surface of the base member. The rack may further include an air permeable theft prevention mesh layer attached to the support framework on at least the first or second sides of the rack and substantially covering a vertical surface of each of the first and second sides. Additionally, a plurality of substantially planar structural members positioned on a lower side of the base member may be provided, where the plurality of substantially planar structural members being configured to engage a corresponding number of rollers positioned on a floor of a railcar.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the features and embodiments of the invention. Together with the description, the drawings serve to explain the principles of embodiments of the invention.

DETAILED DESCRIPTION OF THE PREFERRED EMBODIMENT

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Additionally, in the following, reference is made to various exemplary embodiments of the invention. However, it should be understood that the invention is not limited to any of the specifically described exemplary embodiments.

Rather, the invention may include any combination of the features and elements described herein, whether related to different embodiments. Furthermore, various exemplary embodiments of the invention provide numerous advantages over the prior art. However, although the various exemplary embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any exemplary inventive subject matter disclosed herein and shall not be considered to be an element or limitation of the appended claims except where explicitly recited in a claim(s).

Embodiments of the invention presented herein may be used for centralized cargo transfer. Exemplary embodiments of the present invention are particularly suited for centralized cargo transfer between rail and truck transport vehicles. For purpose of explanation and illustration, and not limitation, an exemplary embodiment of the system in accordance with the invention is shown in FIGS. 1A and 1B and is designated generally by reference character 10.

Figure 1A:
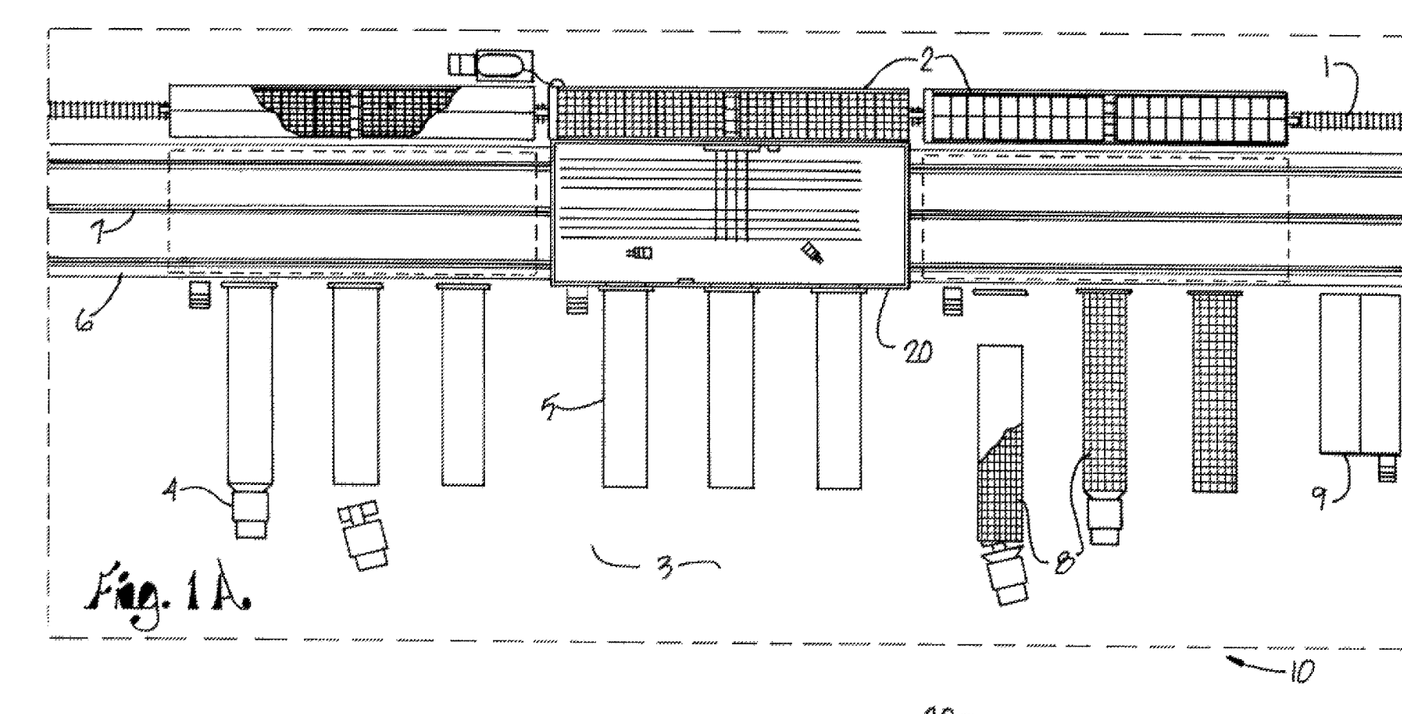
FIGS. 1A and 1B are representations of a central transfer facility in accordance with an embodiment of the invention.
Figure 1B:
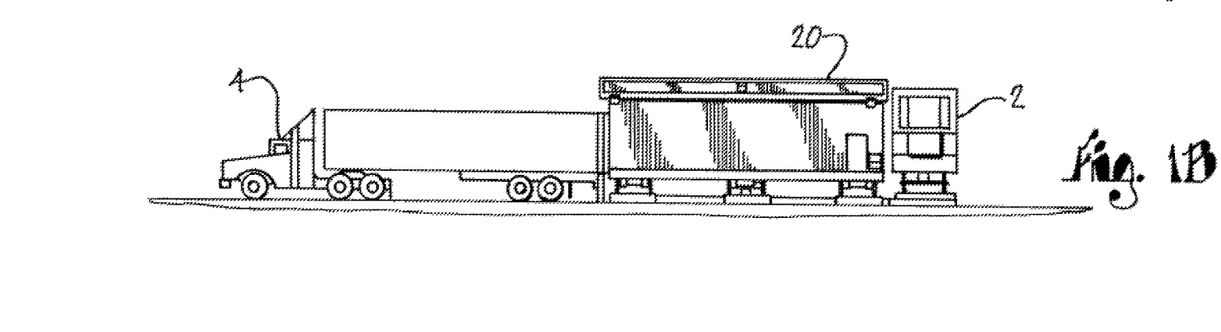

As shown in FIGS. 1A and 1B, the exemplary system 10 is generally described as system for centralized transfer of cargo to and from truck trailers and railcars. The system 10 comprises a first railway 1 to accommodate railcars 2. It will be understood that the reference to railcars 2 may also include boxcars. In practice, the first railway 1 is likely to be any of the numerous rail lines currently used to transport goods or cargo. In addition, the first railway 1 may be a separate railway into and/or out of a loading station at some rail depot. Accordingly, the rails cars 2 may be coupled together as part of a longer train, or may be individual cars that have been decoupled and moved to a separate rail line for loading or unloading before being re-coupled to the train. In addition, the railcars 2 may be any type of railcar suitable for the transport of goods, including without limitation, refrigerated railcars. The system 10 further comprises a staging area 3. The staging area 3 is typically a large area that abuts the rail depot to allow multiple trucks and other cargo-carrying vehicles to drive up for loading and unloading. In the present embodiment, trucks 4 back up onto the staging area 3 and unhitch their cargo-carrying trailers 5 for loading and unloading. The system 10 further comprises a second railway 6 positioned between the first railway 1 and the staging area 3 to accommodate a movable transfer dock 20. The movable transfer dock 20 will be described in further detail below. In an exemplary embodiment, although not necessarily, the second railway 6 is wider than the first railway 1 and comprises two outside rails for engagement with the wheels of the transfer dock 20, and a center hot rail 7 for maintaining an electrical connection between a power source and the transfer dock 20. The transfer dock 20 is movable along the second railway 6 between trucks 4 in the staging area 3 and the appropriate railcar 2. In accordance with the present embodiment, cargo 8 is transferred via the transfer dock 20 between trucks 4 and the appropriate railcar 1.

Figure 2A:
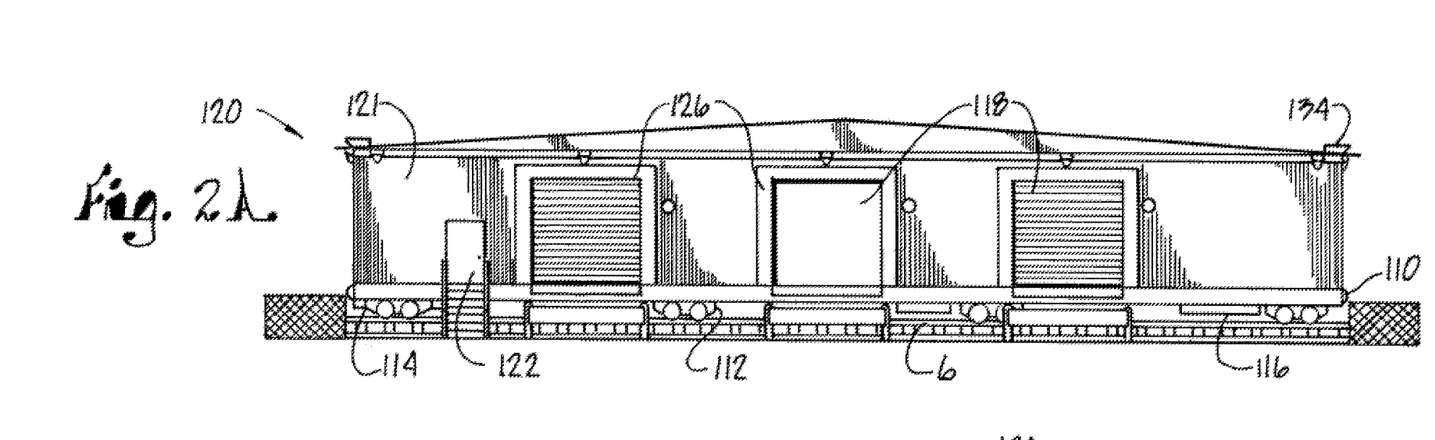
FIG. 2A is a side view of an embodiment of a movable transfer dock in accordance with the present invention.
Figure 2B:
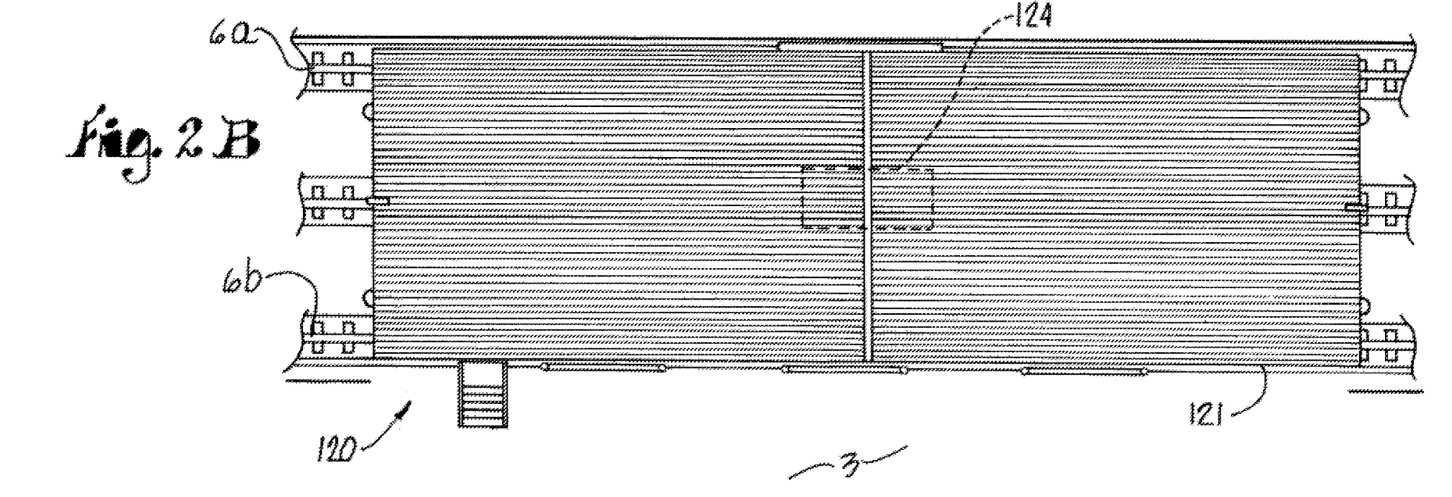
FIG. 2B is a top plan view of an embodiment of a movable transfer dock in accordance with the present invention.

A detailed description of a transfer according to an embodiment of the present invention is provided below with reference to FIGS. 5A-5C. FIGS. 2A and 2B depict an embodiment of a movable transfer dock 120 in accordance with the present invention. The movable transfer dock 120 is but one embodiment of many movable transfer dock embodiments that are within the scope of the present invention and in accordance with the claims. In the present embodiment, the movable transfer dock 120 comprises a movable platform 110 having a plurality of wheels or rollers 112 there under to support the platform 110 on a plurality of rails 6a, 6b. In an exemplary embodiment, although not necessarily, the platform 110 is approximately 80-85 feet long and 30-34 feet wide. It should be apparent, however, that the platform 110 could be built to any size, such as to accommodate the intended cargo or the space available at the transfer facility wherein it is to be used or to facilitate the efficient loading or unloading of cargo and/or cargo containers. In one embodiment, the transfer dock 120 includes a drive motor 114 mounted beneath the platform 110 for moving the transfer dock 120 along the railway 6. The drive motor 114 is coupled to some plurality of the wheels or rollers 112 via a transmission known in the art. In yet further embodiments, the transfer dock includes a pressurized air source 116, whose utility and advantages will be described in detail below with respect to FIGS. 4A and 4B. The present embodiment of the transfer dock 120 further comprises an enclosure unit 121. The enclosure unit 121 is assembled to the platform 110 and comprises a plurality of side and end walls and a roof. The enclosure unit 121 further comprises a plurality of doors 118 receiving and depositing cargo. In an exemplary embodiment, although not necessarily, the doors 118 are approximately 12-14 feet wide, depending upon whether the door 118 is to open adjacent a truck 4 or a railcar 2. Other design criteria may also be used in creating the doors 118 without limitation of the present invention. The enclosure unit 121 may also include one or more personnel doors 122 for the entry and exit of personnel working within the transfer dock 120.

In another embodiment of the transfer dock 120, the enclosure unit 121 includes a cooling unit 124 (depicted by dotted lines in FIG. 2B) such as an air conditioner or refrigeration unit. This embodiment is especially suited for the transfer of refrigerated or frozen goods between refrigerated trucks and refrigerated railcars. In this embodiment, the entire transfer dock 120 may comprise one or more layers of insulation.

Figure 3:
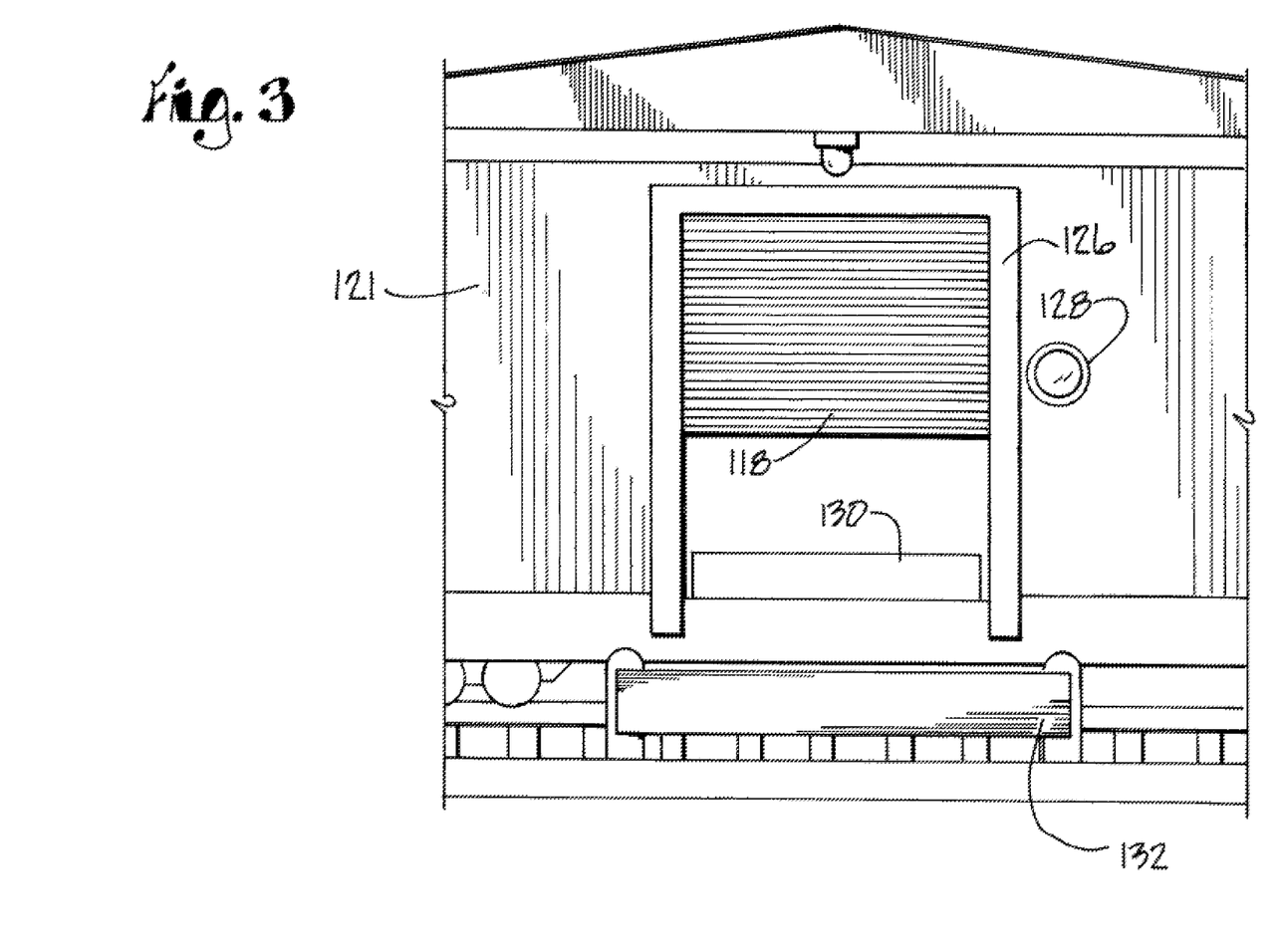
FIG. 3 is a side view of a door of an embodiment of a movable transfer dock in accordance with the present invention.
Figure 3B:
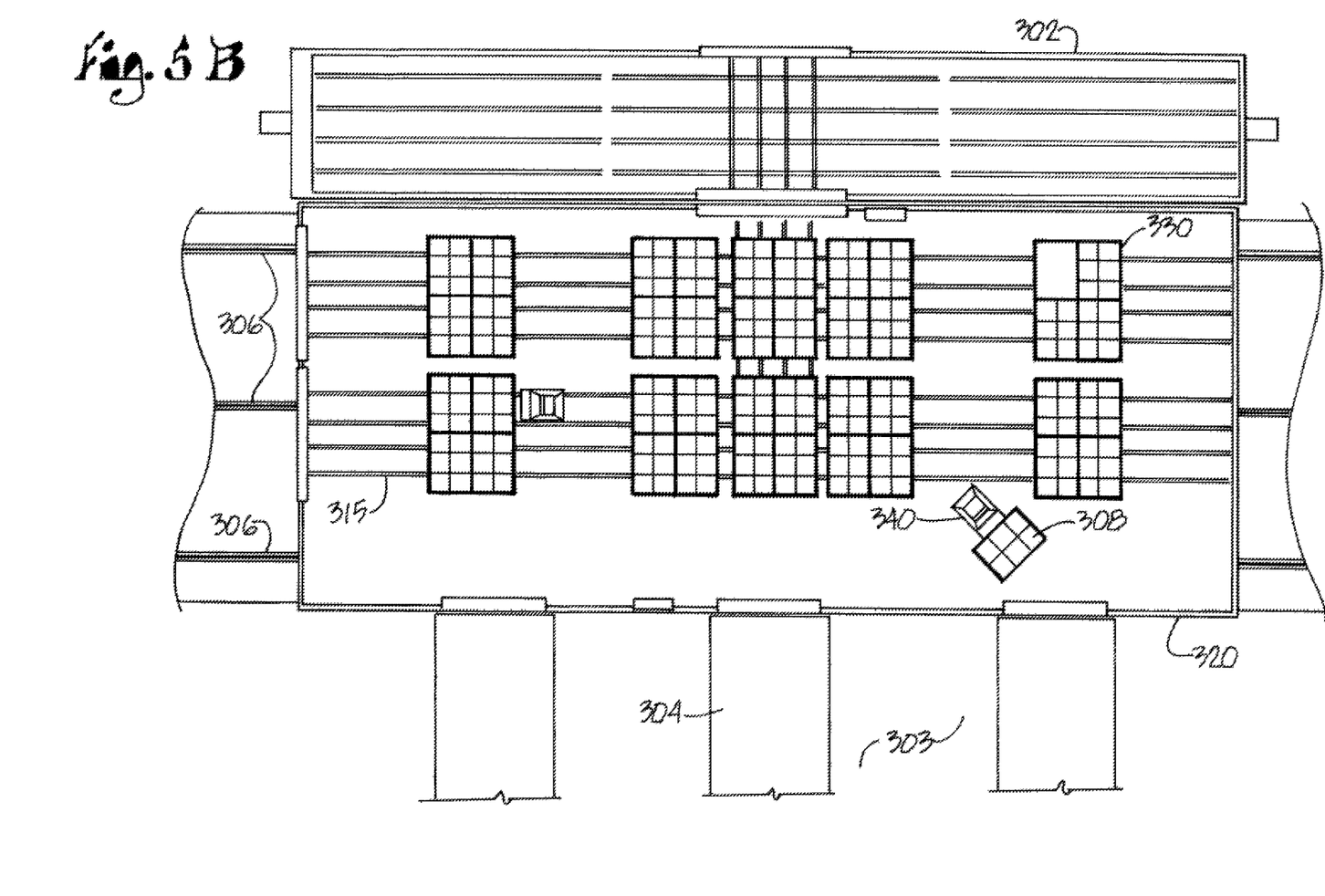

Referring to FIG. 3, to further conserve energy and maintain the temperature within the enclosure unit 121, the unit may be fitted with expandable seals 126 about the periphery of the doors 118. The expandable seals can be positioned to create a seal between the door 118 and a corresponding opening of a truck 4 or railcar 2. The curtain seals 118 can be expanded or retracted via air pressure from a pressurized air source 116. Alternatively, the curtain seals 118 may be connected to an outside pressure source at the depot wherein feeder lines running along the rails of the depot are hooked up to the transfer dock. The air pressure source 116 may also be used for charging railcar air brake systems or for pressurized car cleaning applications. In yet further embodiments, the transfer dock 120 might include a back-up indicator 128. The back-up indicator 128 of the present embodiment includes a sensor that triggers an audible alarm if a truck 4 backs up too close to the transfer dock 120. The transfer dock 120 might also include a ramp extension 130 that may extend out from the door 118 to engage the unloading or loading end of the truck 4. The ramp extension 130 may be manually operable, or might be mechanically operable through, for example, hydraulic or pneumatic jacks or a motor. The transfer dock 120 could also include bumpers 132. In an exemplary embodiment, the bumpers 132 are made of a resilient elastomeric material such as rubber and are mounted to the platform 110 in the area of the doors 118.

Figure 4A:
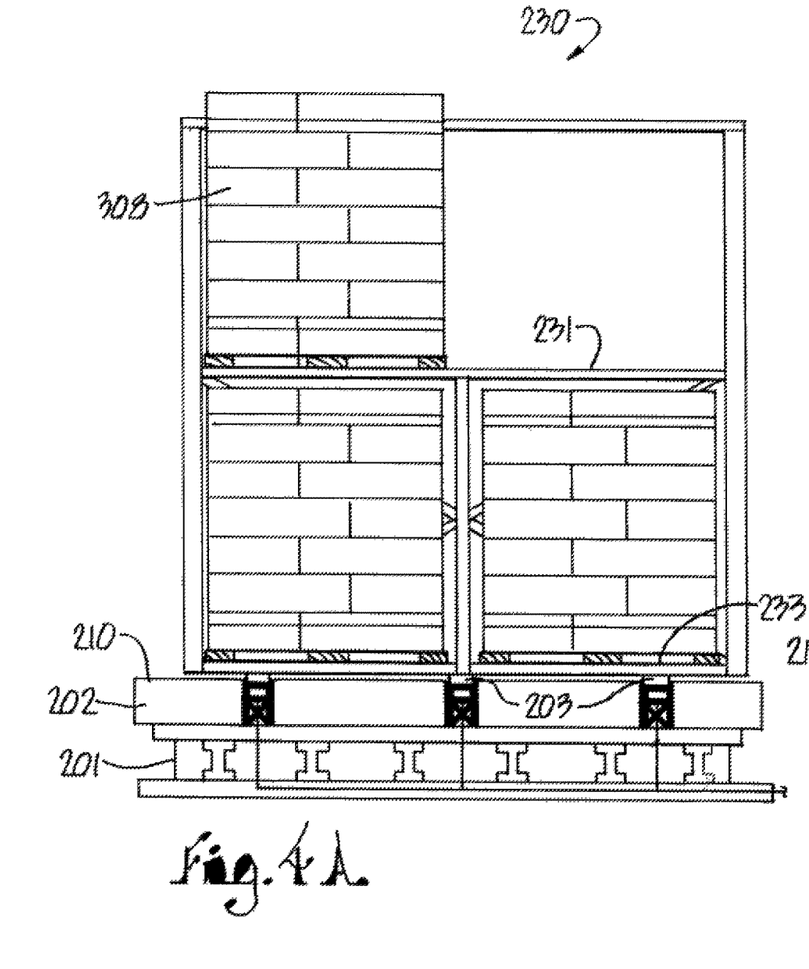
FIG. 4A is one side view of an embodiment of a conveyor means and palletized cargo container in accordance with the present invention.
Figure 4B:
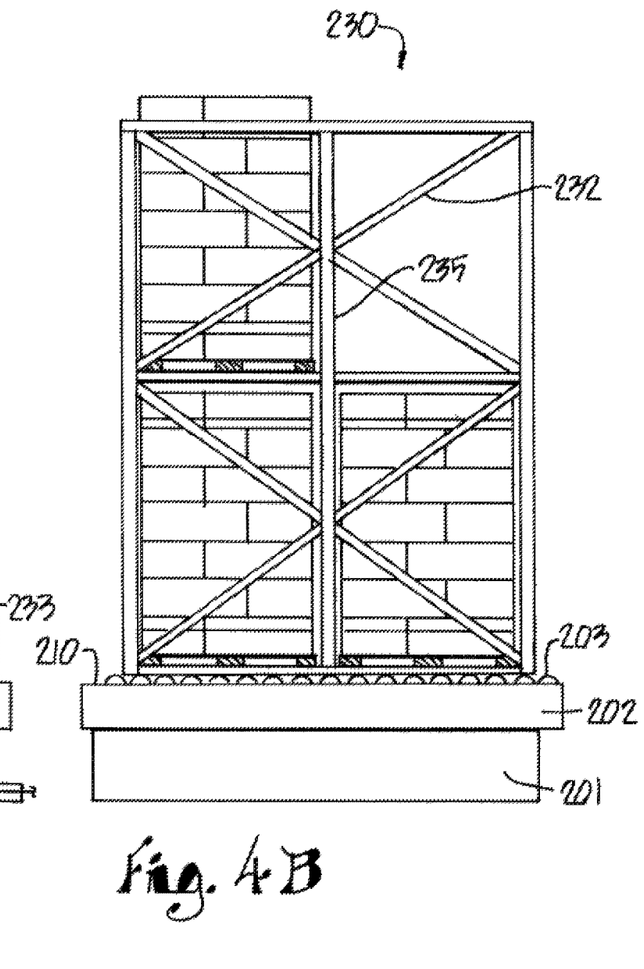
FIG. 4B is another side view of the embodiment of the conveyor means and palletized cargo container in accordance with the present invention as depicted in FIG. 4A.

Referring again to FIG. 2A, the transfer dock 120 might comprise one or more video cameras 134. The video camera 134 can be, although is not necessarily, mounted onto or adjacent the exterior of the roof portion of the enclosure unit 121. The video camera 134 can be used to monitor the area surrounding the transfer dock 120 so that an operator on the inside of the enclosure unit 121 can operate the motor 114 to safely drive the transfer dock 120. The camera 134 may also be used for other safety or security purposes, such as to ensure that personnel are not on the tracks 6 in the vicinity of a moving transfer dock 120. The camera 134 could also be mounted within the enclosure unit 121 to monitor the activity of personnel while they are loading or unloading the transfer dock 120. In an exemplary embodiment, the camera 134 is connected via a video connection to monitors within the enclosure unit 121. In alternative embodiments, signal may be sent from a transmitter coupled to the camera 134 to monitors at a coordinating station 9 at the transfer depot (see FIG. 1). In alternative embodiments of the present invention, the transfer dock may be provided without an enclosure unit. Referring to FIGS. 4A and 4B, in this embodiment, the transfer dock 220 is essentially an open movable platform 210. In an exemplary embodiment, the platform 210 comprises a base 201 having a top surface that includes a pre-cast concrete floor 202. The top surface floor might also be constructed of metal or some form of composite material.

In an exemplary embodiment, the base 201 comprises a metal framework facilitating attachment of drive motors or other drive mechanisms and a conveyor means. The base may also include mechanisms for raising or lowering sections of or the floor 202. This ensures a level surface between the transfer dock surface and an interior railcar floor for moving specialized cargo containers in or out of the car. In general, the transfer dock further comprises a conveyor means 203 for facilitating movement of cargo or cargo containers. In addition, according to another aspect of the invention, railcars are outfitted with the herein described conveyor means. In one embodiment, the conveyor means for facilitating comprises a plurality of intersecting runners. In further embodiments, the conveyor means might comprise a plurality of mechanized conveyors, such as conveyor belts. In yet another embodiment, the conveyor means comprises a plurality of intersecting rollers that can be selectively raised above the surface of the floor using pneumatic pressure from a pressurized air source below.

The system according to the present invention could also include the use of palletized cargo containers 230 for storing cargo. The palletized cargo containers allow maximum efficient use of space within the railcars and on the transfer dock. In addition, the palletized cargo containers help secure loads during shipment, minimizing load damage, and provide means for stacking cargo without crushing the loads. In an exemplary embodiment, the containers are configured to handle eight pallets of freight with individual load dimensions of 40"×48"×60". The pallets are stacked four pallets on top of each other utilizing a secondary tier or platform 231 within the container to separate the loads. The containers are specifically adapted and may be manufactured from a metal, such as aluminum, iron or steel, or constructed entirely or in part using various composite materials or alloys. The containers 230 may also be coated with a protective covering for ease of cleaning and to prevent rust. The container 230 can be configured in a variety of ways to address specific needs of the shipper and to fit a specific type of boxcar selected for shipment. The container can be constructed in a variety of ways and with a variety of materials, again depending on the specific needs of the shipper or the type of boxcar equipment used. Basically, the container is cube shaped having two side walls 232 (one not shown in FIG. 4B) to restrict the lateral motion of the palletized products during shipment. These side walls 232 face each side of the car when loaded. The other two sides of the container 230 are open to facilitate loading of palletized products on the bases 233 and one or more tiers 231 that are arranged at heights specific to the height of the palletized loads. The tier(s) 231 can be fixed or adjustable depending on load configurations and customer requirements. The top of the container 230 is open.

The two open ends of the container 230 face each end of the car when loaded. The longitudinal movement of the palletized loads 308 is restricted either by the car ends or by products in adjacent containers. In practice, a restraint device may be used at the center of the car to restrain the two centermost containers 230 and palletized loads 308 since there will be a small gap in the railcar to facilitate loading and unloading of the containers. Once this device is in place, then the containers will extend from one end of the car and will not be able to move longitudinally in the railcar. A common floor 233 is provided as a base for the container. This is used to support and secure the two side walls 232 of the container 230, and may be used to support and secure a central cross frame 235 that is also used support and secure the side walls 232. The cross frame 235 may also be used to support and secure subsequent tiers 231 for load stacking.

The bottom of the base 233 can be solid or have runner strips attached which will contact the conveyor means 203. The top of the base 233 can either be solid or grated to support the lower stack of palletized products 308. Subsequent platforms 231 can also be solid or grated depending on the product requirements. The top of the container is open to facilitate placement of palletized loads on the uppermost tier of the container.

Generally, a standard configuration of the container will include a base 233 and a second tier including a platform 231 for loading of palletized products 308. The pallets will be of a standard 40"×48" dimension and will be approximately 60" in height when loaded with products. Four pallets will be placed on the lower tier of the container and four more on the second tier for a total of eight pallet loads per container.

Because the conveyor means 203 allows easy movement of the containers 230, it is unnecessary to access the cargo 308 directly via a forklift or other device. This minimizes potential damage to the cargo 308. In addition, the essentially open structure of the container 230 in an exemplary embodiment allows greater air circulation to cool the cargo 308 in a refrigerated environment. Finally, the size of the container 230 is adapted to efficiently fit within a railcar but at the same time hold cargo pallets 308 that are adapted to fit within a truck trailer. This novel feature ensures efficiency of both rail and road transport.

The transfer dock might also include some means for temporarily securing the transfer dock in place. In one embodiment, depicted in FIG. 6, the transfer dock might include pins that engage bores on the side of the railcars for stabilizing the transfer dock.

Figure 5:
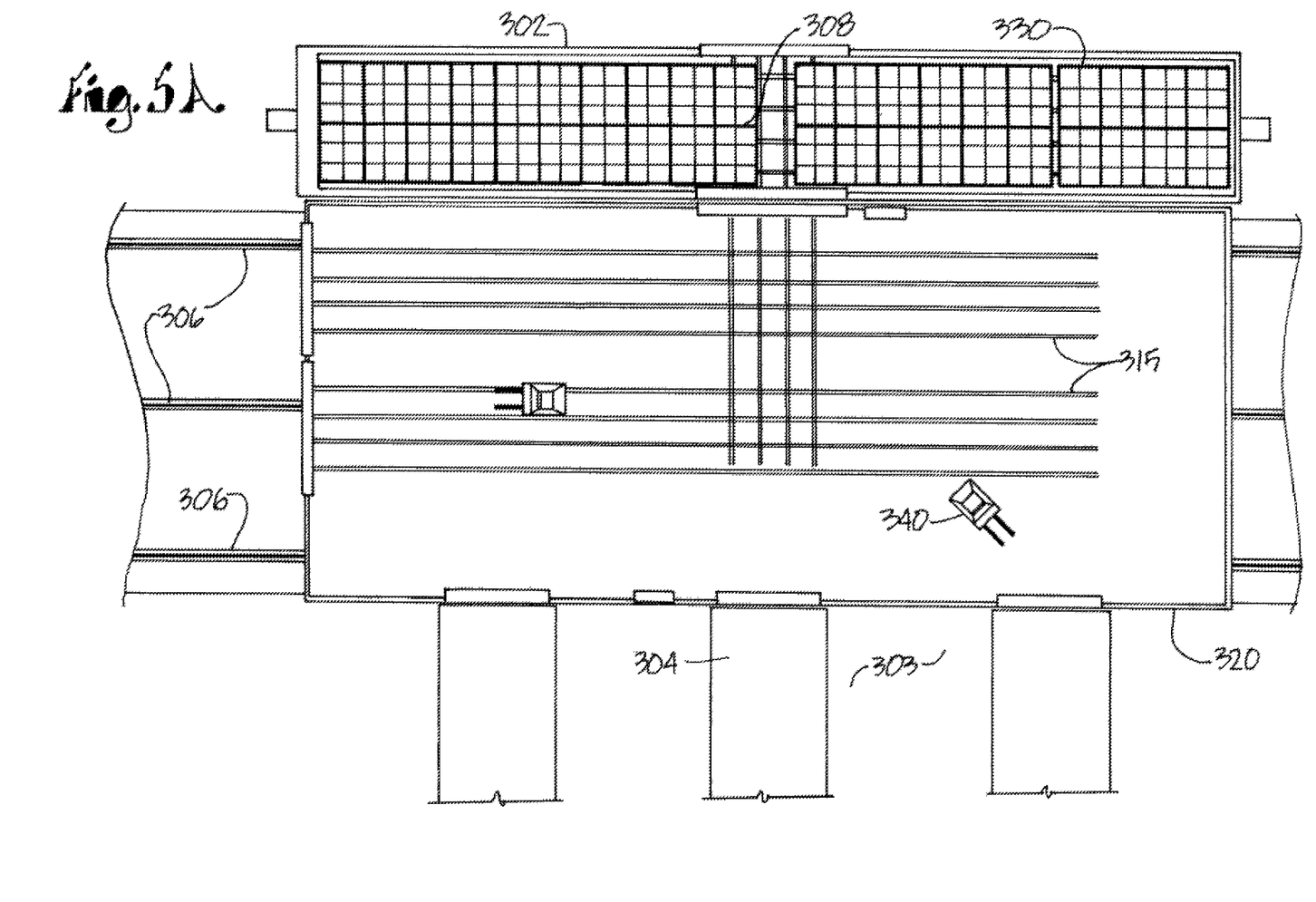
FIG. 5A is a representation of a movable transfer dock in use at a central transfer facility in accordance with an embodiment of the present invention.
FIG. 5B is a representation of a movable transfer dock in use at a central transfer facility in accordance with an embodiment of the present invention.
FIG. 5C is a representation of a movable transfer dock in use at a central transfer facility in accordance with an embodiment of the present invention.
Figure 5C:
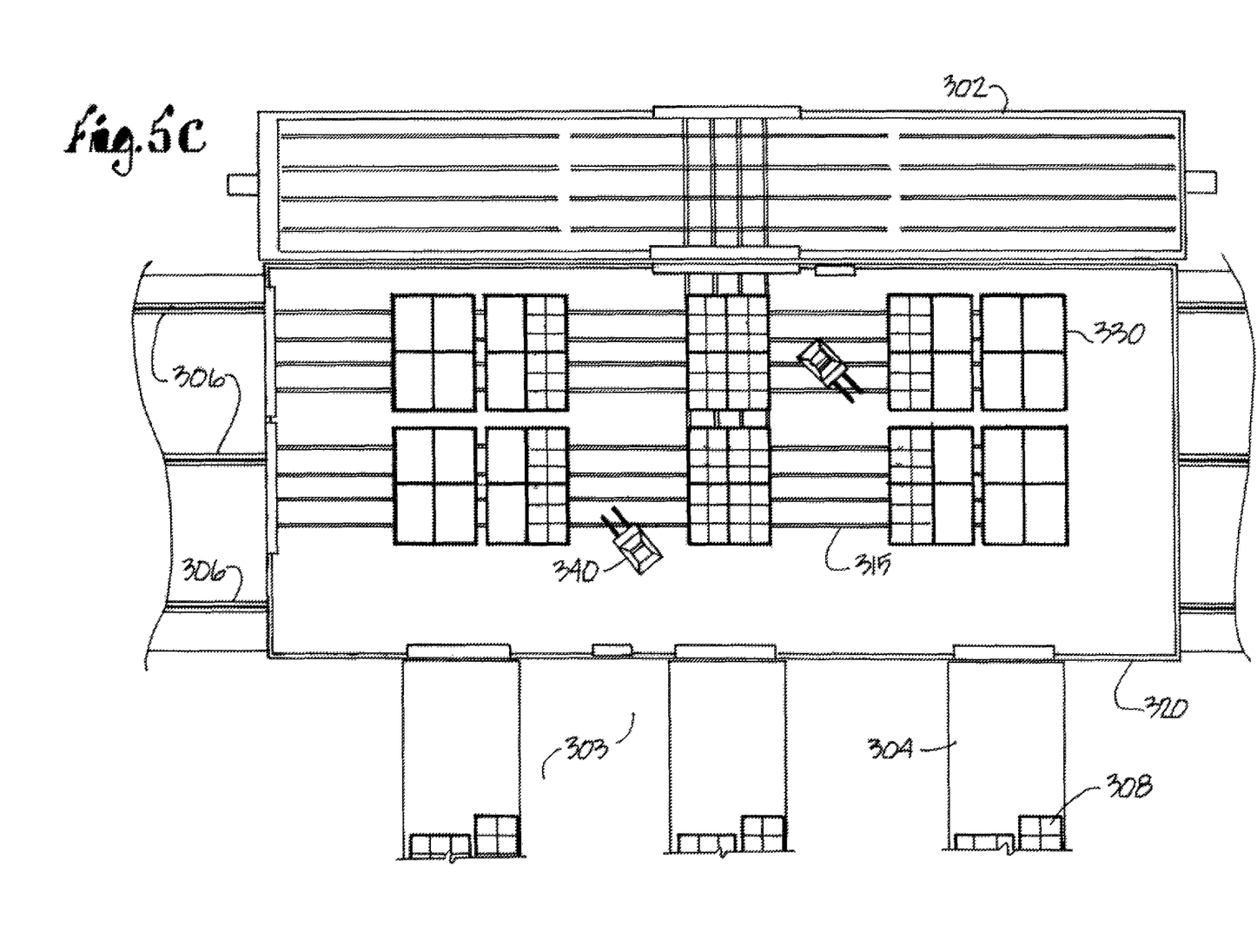

Referring to FIGS. 5A-5C, the operation of an embodiment of the system of the present invention will now be described. Although the system is described herein with respect to the transfer of cargo from rail to truck, the present system is adaptable to transfer from truck to rail, or even from rail to rail without departing from the scope of the claims of the invention. In FIG. 5A, a railcar 302 is filled with cargo 308 stored in palletized cargo containers 330. Trucks 304 are awaiting loading in the staging area 303. Between the staging area 303 and the railcar 302 is a railway 306 with a movable transfer dock 320 thereon. The transfer dock 320 comprises a means 315 for facilitating movement of cargo, such as runners or rollers as described in detail above. Forklifts 340 are also available for moving the cargo 308 over the transfer dock 320. In FIG. 5B, the palletized cargo containers 330 have been removed from the car 302 and move along the facilitating means 315 to a desired position on the transfer dock 320. Forklifts 340 remove cargo 308 from the containers 330 for loading onto the trucks 304.

In FIG. 5C, the forklifts 340 have transferred some of the cargo 308 into the trucks 304. As can be seen from this depiction, varied cargo 308 may be transported via the railcars 302 and efficiently transferred to a plurality of trucks 304. When trucks 304 have been filled, or once car 302 has been emptied, the containers 330 can either be reloaded or moved as empties back into the railcar 302 for reverse shipment. The transfer dock 320 can then be disengaged from the railcar 302 and moved along the railway 306 to the next appropriate railcar spot for additional loading and unloading. Accordingly, efficient transfer of cargo between rail and truck is achieved.

FIGS. 6A-6D depict an embodiment of the present invention disclosing a particular means for temporarily securing the movable transfer dock to at least one of the railcars. In this embodiment, the transfer dock 420 comprises a pivotal extension 450 connected at its distal end 451 to the transfer dock 420 via a jack 460 and pivotally connected at its opposite end 452 to the transfer dock 420. The jack 460 may be a hydraulic or pneumatic jack, or other mechanical mechanism for pivoting the pivotal extension 450. In the case of a hydraulic jack, the jack 460 is connected to the pressurized air source described above. The distal end 451 of the pivotal extension 450 also comprises a lip portion 453 which defines a groove 454 which may run along the length of the outer periphery of the extension 450.

According to an exemplary, the railcar 402 is outfitted with a lip portion 470 defining a groove 474 oppositely oriented to the lip portion 453 of the transfer dock 420. For instance, whereas the lip portion 453 of the transfer dock 420 defines an upwardly open groove 454 when the extension is fully pivoted, the railcar 402 has an oppositely (that is, downwardly) oriented groove 474. In this manner, the transfer dock extension lip portion 453 may be engaged in the railcar groove 474, while the railcar lip portion 470 may be engaged in the transfer dock extension groove 454.

Figure 6A:
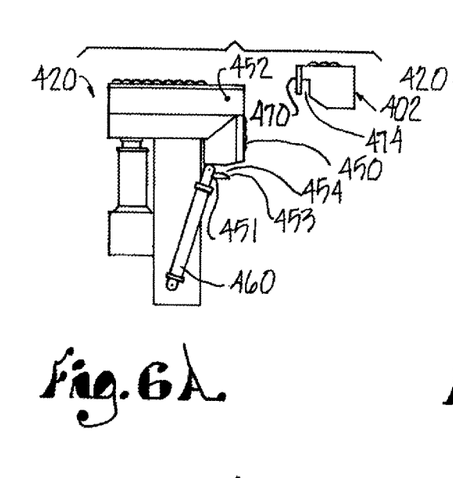
FIGS. 6A-6D are embodiments of the present invention depicting a means for temporarily securing the movable transfer dock to at least one of the railcars.
Figure 6B:
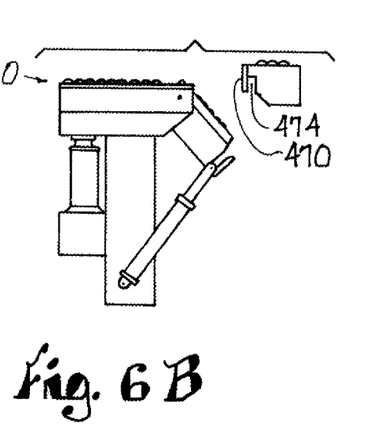
Figure 6C:
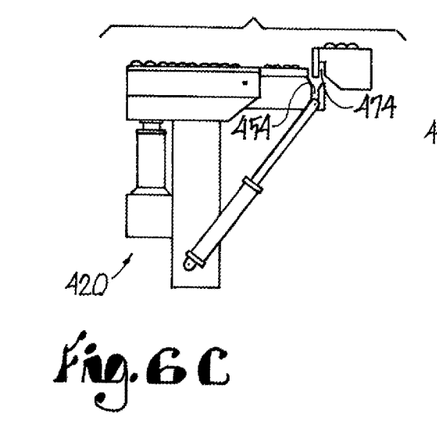
Figure 6D:
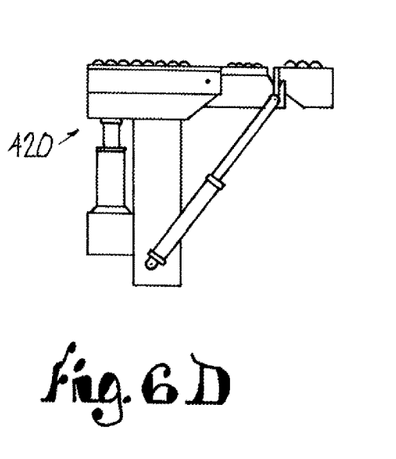

When the transfer dock 420 is proximate the railcar 402, the jack 460 operates to pivot the extension 450 into a planar position with the top surface of the transfer dock 420 (see FIGS. 6B and 6C). Once the extension 450 is fully pivoted, another jack 480 connected to a pressure source (such as, for example, the pressurized air source described above if pneumatic jacks are utilized) raises the entire surface of the transfer dock so that the respective lip and groove portions are engaged. Thus, the transfer dock 420 is temporarily secured to the railcar 402. The process can be reversed (that is, the transfer dock 420 lowered and the extension 450 retracted) for disengaging the transfer dock 420 from the railcar 402. In alternative embodiments, the extension 450 may be provided without being pivotally connected. According to that embodiment, the lip portion and groove are thus permanently oriented for engagement with the railcar upon raising of the transfer dock 420.

Figure 7:
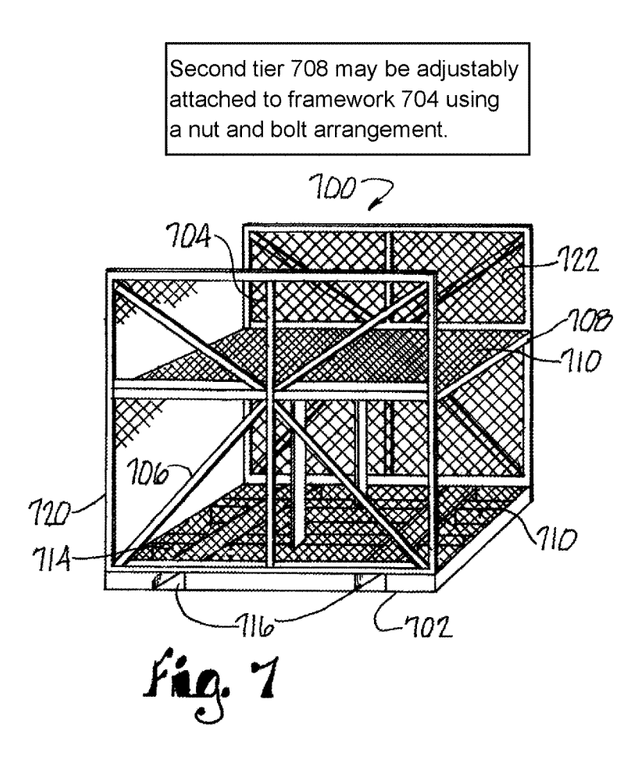
FIG. 7 illustrates an exemplary tiered loading rack of the invention.

In another exemplary embodiment of the invention, a specialized container used for transporting temperature sensitive freight in a refrigerated railcar is provided. The specialized container, which is generally referred to herein as a tiered rack, is generally capable of handling unit loads that may be stacked on either standard pallets, slip sheets (which allow for approximately 10% more product to be loaded in the same space when compared to pallet loads), or other spacing material using a tiered arrangement separating the unit loads. FIG. 7 illustrates an exemplary tiered rack 700 of the invention. The tiered rack 700 includes a base frame member 702, which may be square or rectangle in shape, where the shape may be determined by the size of the railcar or other transportation medium in which the tiered rack 700 is to be transported. However, the shape of the container is contemplated as being any shape and is not limited to square or rectangular shapes.

The base frame member 702 has a generally rigid upstanding structural support framework 704, 706 extending therefrom. The framework 704, 706, which can be any form of structural framework used to support a load, is configured to support a second tier base 708. Both the first and second tier bases 702, 708 may include a perforated, mesh, or other air permeable means of supporting weight 710 positioned thereon. Although an air permeable support floor for each tier base 702, 708 may be used, solid flooring may also be used in some embodiments. In one exemplary embodiment of the invention, the rack 700 may use a metal wire mesh to support weight on each of the first and second tiers 702, 708, as shown in FIG. 7. The base 702 may also include lower frame support members 714 positioned below the mesh 710, and these lower frame support members 714 are generally spaced and positioned to cooperate with pneumatically actuated rollers (further discussed herein) positioned in or on the floor of railcars.

At least one of the upstanding sides of the rack 700 may also include a mesh 722, which may operate to prevent theft of cargo from a railcar (the mesh 722 prevents side access to the freight in the event that a side door of a railcar is opened by an unauthorized person). The adjacent sides 720 of the rack 700 are generally open to facilitate loading and unloading of the tiers 702, 708. Thus, in at least one embodiment, two opposing sides of the rack 700 may be closed by mesh, while the other two opposing sides are open and accessible for loading. In yet another embodiment, one side of the rack 700 may be closed by mesh, while the other three sides are open and accessible. Additionally, the base frame member 702 generally includes fork slots 716 configured to receive the forks of a forklift to lift and move the rack 700.

In another exemplary embodiment of the invention, the second tier base member 708 may be adjustably attached to the upstanding support framework 704, 706 so that the height of the second tier base 708 may be adjusted to receive varying sizes of cargo on the first or second tiers 702, 708. The adjustment of the height of the second tier may be through a nut and bolt arrangement, a pin and hole arrangement, a slotted frame and pinned tier member arrangement, or any other mechanical means (generally known in the freight or warehousing industry) that may be used to quickly adjust the height of the second tier. In one exemplary embodiment of the invention, the height of the second tier may be pneumatically adjusted. Additionally, if desired, additional tiers may be added to the support framework 704 to allow for stacking of additional tiers (third, fourth, etc.) of cargo.

In one exemplary loading configuration, 8 unit loads (a unit load may be defined as a 4'×4' pallet stacked to between four and five feet tall) may be carried on a single rack 700. In this exemplary configuration, four unit loads may be placed on the lower level and four unit loads are placed on the second level of the rack 700, thereby separating loads on the lower level from those on the second level, i.e., the loads on the second level are not supported in any way by the loads on the first level. This separation prevents crushing of products including the unit load that may have height restrictions for stacking due to the weight of the product and the structural integrity of product packaging (which is again where the adjustability of the height of the second tier of the present exemplary embodiment is useful). The exemplary rack 700 also enables full utilization of previously unused freight car capacity. Additional container (levels) may be added depending on the configuration of unit loads.

The configuration of rack 700 also provides for air flow around the individual loads in a refrigerated transportation environment. More particularly, the mesh support 710 allows cold air distributed from a conventional refrigeration unit located on a first end of a railcar to travel through the existing air plenum running the length of the car, generally at the top of the car, to the other opposing end of the railcar. Further, using the rack 700, the cool air is allowed to fall through a series of holes located at the bottom of the air plenum (at the top of the car) around each of the loads as the air travels the length of the railcar in the plenum. Thus, rack 700 allows for each (pallet) of the entire load on the rack 700 to be enveloped with cold air around the top, sides, and bottom of both the first and second tiers, which operates to eliminate hot spotting of products and product degradation and spoilage during shipment.

The rack 700 provides for load securement during rail transit with the mesh sides 722 of the rack 700 preventing shifting of unit loads against the side wall of the freight car. This may occur when the car is in motion resulting in lateral movement of the unit load, which often results on communication of heat present in the side walls of the railcar to the load. In situations where the cargo is perishable, such as food products, the load contact with the sidewall of the railcar can cause a hot spot or spoilage of the product in the area of the contact with the sidewall. The rack 700 securement sides 722 prevents loads from contacting the side wall of the car which may result in possible temperature variation within the product. The mesh sides 722 also prevent shifted loads from contacting the interior side wall of the railcar and potentially obstructing container movement in the car during the unloading process or causing damage to the side wall of the railcar. Load security can be further enhanced by placing screen mesh along the sides of the container positioned in the doorway of the car thereby preventing pilferage and product theft if the freight car door is opened during transit (as noted above) or left unsecured at a loading dock location. This is a particularly important feature in areas where load security is a major shipping concern, such as in foreign countries or areas prone to crime.

The rack 700 also provides load securement longitudinally in the railcar preventing loads potentially shifting from one end of the car to the other during transit. This is accomplished through the loading process whereby racks 700 are positioned against each end of the car and against each other on the load sides. The racks 700 generally extend beyond a perimeter of the load being carried on the racks 700, and as such, even though the rack 700 may be secured against the end of the railcar, the freight will not touch the wall of the railcar. In another embodiment of the invention, bump stops may be positioned near the end of the railcar to prevent the rack from being placed directly in contact with an end wall of the railcar.

The racks 700 are essentially locked in position end to end within the freight car with the exception of a small remaining unoccupied space between two racks 700, if desired. The space may be located near the center of the car between the racks 700 last loaded at the door or access way. After loading is complete, the remaining space may be filled with an inflatable air bag common to rail and truck transit. The air bag is positioned between the load sides of the racks 700 located near the door opening and inflated against the load sides of the doorway racks 700 to keep all loads from moving in the car once the air bag is inflated. The air bag also ensures there is no high volume cold air drop over the unoccupied space which may reduce the amount of air moving and dropping over loads positioned toward an end of the car. The air bag can then be deflated and removed to facilitate unloading of racks 700 once the freight car reaches destination.

The rack 700 is configured to be used in conjunction with a floor mounted pneumatic roller track system that enables the rack 700 to be moved longitudinally in the car after being placed in the center of the car at the door opening. When actuated, the track rollers extend from the floor of the railcar and contact the base of the rack 700 along multiple runners 714 which extend longitudinally across the base 702 from one load side to the other. The load runners 714, as noted above, are generally configured to match the spacing and positioning of floor track roller system layout and provide a contact surface with the rollers for moving containers longitudinally in the car.

Additionally, the runners that contain the rollers are generally attached to the floor of the railcar (or otherwise extend upward therefrom if positioned in the floor), and as such, the runners containing the rollers generally create an air plenum between the floor of the railcar and top of the runner that is useful in facilitating the refrigeration airflow within the railcar. The plenum or space between the tops of the runners and the floor of the railcar enables cold air to envelop the bottom of the loads and minimizes rack weight to provide more product load capacity in the railcar. In addition, the rack 700 and roller track design facilitate air movement under the rack 700 back to the refrigeration unit with minimal railcar modification. For example, a refrigeration unit may be placed at one end of a railcar and may distribute cool air through a plenum along the top of the railcar. The plenum formed at the bottom of the railcar between the floor and the top of the runners may be used as a return air path for the air circulated through the railcar to return to the end of the car having the refrigeration unit. This recycling of air is necessary for efficient cooling and is helpful to refrigerated transit. The rack 700 design is also capable of working with fixed roller systems inside the railcar with the runner configuration adapted to the roller layout.

The rack 700 has been designed with fork pockets 716 running laterally across the base of the rack 700 from one securement side to the other. These fork pockets 716 have been engineered and positioned to enable a high capacity fork truck to engage the base of the rack 700 from either securement side and position the forks under the first level of the rack 700. When this is accomplished, the fork truck mast is tilted back (if necessary) to allow for deflection of the forks and to keep the load in a level position for a vertical lift. This allows the rack 700 to then be moved by the high capacity fork truck for placement, which is generally either into the railcar for shipment or out of the railcar onto the loading dock for product distribution.

Figure 8A:
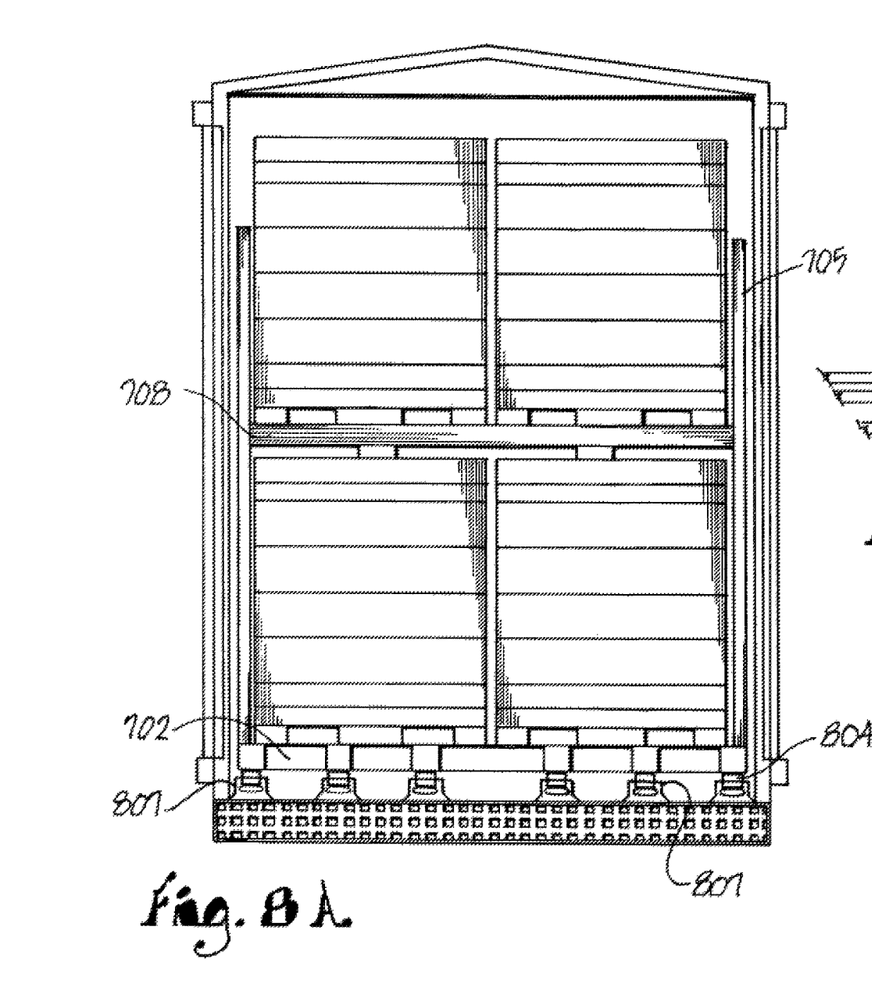
FIGS. 8A, 8B and 8C illustrate a schematic methodology for an exemplary loading process of the invention.
Figure 8B:
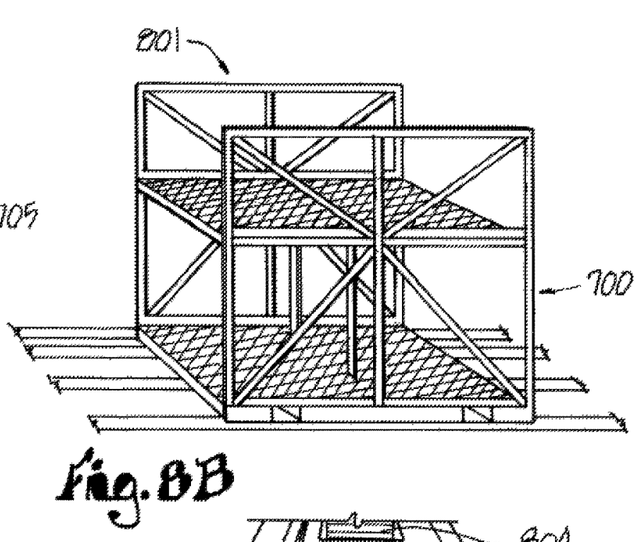
Figure 8C:
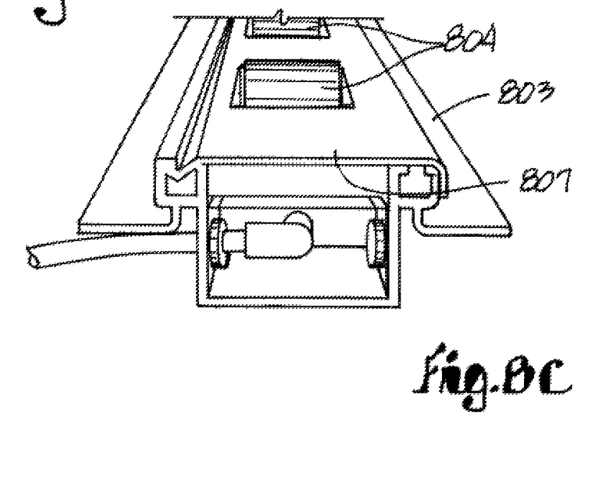

FIGS. 8A, 8B and 8C illustrate a schematic methodology for an exemplary loading process of the invention. At step 801, an exemplary tiered rack 700 may be loaded with up to eight pallets (or slip sheets) of freight. The loading may be conducted at a remote location or on a loading dock adjacent a railcar. Once the tiered rack 700 is loaded with freight, the tiered rack 700 is transported to the railcar, generally with a forklift. However, the forklift does not enter the railcar to deliver the rack 700. Rather, as illustrated at step 803, a pneumatically actuated roller system is activated to cause a plurality of rollers 804 to extend from a roller track 807. The rollers 804 may be cylindrical, thus allowing for only linear movement of the rack 700 there over, or alternatively, the rollers 804 may be spherical and contained in a semispherical housing that allows the spherical roller to move in any rotational direction. With the spherical rollers, the rack 700 may be moved in any direction over the rollers 804. The track 807 is generally between 1 and 6 inches tall and may be positioned on top of the floor of a railcar, or at least partially recessed into the floor of a railcar if desired. The track 807 generally extends longitudinally along the entire length of the interior of the railcar, however embodiments of the invention are not limited to configurations where the track 807 extends the full length of the railcar. Rather, any length, number, spacing, height, etc. of tracks may be used without departing from the scope of the invention.

Additionally, in a standard railcar, there may be between 3 and 10 (or more) of the tracks 807. Additionally, in embodiments where there are multiple tracks 807, not all tracks 807 may be configured with rollers 804 (some tracks may simply be spacers or load supports and may also not extend the full length of the railcar). The rollers 804 are generally actuated by pneumatic pressure, as railcars generally operate on an air pressure-based braking system, which presents an available source of activation for the rollers 804. However, the invention is not limited to using the rail car air supply as the source for the pneumatic actuation, as any available source may be used to actuate the pneumatics. Additionally, a switch or valve may be positioned on or in the railcar to activate (extend) and deactivate (retract) the rollers 804 as required. The switch of valve may be positioned proximate the railcar door or loading access area to allow for convenient access thereto.

The forklift delivering the rack 700 to the railcar for transport sets the rack 700 inside the car on the rollers 804 (if extended) or on the track 807 (if the rollers are retracted). The rollers 804 may then be extended and the rack 700 may be moved toward either end of the railcar. The rack 700 may generally be moved in the car manually, however, embodiments of the invention contemplate that the rollers 804 may be selectively driven to allow for movement of racks 700 within the railcar. For example, the rollers 804 may be pneumatically or electrically driven to allow for movement of the racks 700 within the railcar. The driven movement of the rollers 804 may be controlled by a switch or control panel accessible to an operator or load crew of the railcar.

The process of loading the racks 700 into the railcar generally includes loading successive racks 700 and moving the racks to one of the opposing ends of the car. The racks 700 are positioned against a stop that prevents the cargo or freight on the rack from touching the end of the railcar. Each successive rack 700 loaded may generally be positioned against the adjacent rack 700, however, the racks may be configured such that even though the racks are touching each other, there is still a vertical air plenum or space between the freight on the respective racks to allow for refrigerated air to fall over each of the loads on the racks 700 and between the racks themselves.

Thus, it is apparent that one advantage provided by the rack 700 and exemplary methods of the invention is that the need for fork trucks to be used inside the railcar for handling palletized or slip sheet loads, which is a common source of damage to the interior of rail equipment, is completely eliminated. Fork trucks or lifts lower the racks onto the rollers or tracks containing the rollers without entering the railcar. Damage to railcars is generally due to the interior dimensions of the railcar and limited maneuverability of fork trucks operating inside, and the damage routinely occurs to freight car sidewalls, end walls, door frames, air plenums and roof sheets if the fork truck is not operated properly within the confined space limitations of the freight car. The use of the rack 700 and pneumatic roller system allows for bulk loading (up to eight pallets at a time) of a railcar without a forklift or other heavy machinery from ever entering the railcar, and thus, completely eliminating damage to the railcar from forklifts, while also providing a more efficient method for loading railcars that provides a more efficient flow of refrigerated air. The rack 700 also eliminates hand stacking of loads in the car which is another typical method of loading. The latter process normally involves two or more workers working in combination with a fork truck driver who delivers loads to the door of the car and the car is then manually loaded by workers hand stacking products into the car. This is an expensive and time consuming process that prevents other loading in the car from continuing until the manual loading process is completed. The rack 700 of the invention allows for workers to load the racks 700 outside of the railcar and then a forklift can deliver the rack 700 to the railcar when the rack is fully loaded. This optimizes loading, as the remainder of the railcar can be loaded with racks 700 while a single rack is hand loaded.

Rack 700 also enables product unit loads to be pre-loaded into the rack 700 prior to the arrival of freight equipment (railcars) at the trans-load dock (at the rail yard). Loaded racks 700 may be staged in preparation for a railcar arrival and spotting. Previously loaded or empty racks may be removed from the railcar and set aside on the trans-load dock, while the staged pre-loaded racks are placed back into the railcar for shipment. Since the physical un-loading and re-loading of the railcar is done expeditiously, the rail equipment can be turned more quickly resulting in better utilization of the equipment asset.

The adjustability of the height of the second tier of the exemplary rack of the invention also provides several advantages not available in conventional shipping methods and apparatuses. For example, the adjustable height of the second tier allows for combination shipping of items that have previously been separated, thus maximizing the freight carried in each railcar. For example, where six feet tall refrigerators have been conventionally shipped alone (without additional freight in a single car), as the refrigerators are not suitable for stacked loads to be placed thereon, the rack of the present invention allows for smaller loads to be safely positioned on a second loading tier above the refrigerators without jeopardizing the integrity of the refrigerators. Thus, the space above the refrigerators that has conventionally been wasted may be fully utilized via the apparatus and method of the present invention.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Having thus described the invention, what is claimed as new and desired to be secured by Letters patent is:

1. A cargo transfer system for loading goods onto a boxcar-type railcar and supporting the goods during transport, the cargo transfer system comprising:
   a conveyor within the boxcar-type railcar comprising one or more rollers extending from a track;
   a cargo container adapted to move along said track having:
      a base adapted to support a first pallet loaded with goods, wherein said first pallet fits entirely within the periphery of said base;
      an upper platform above said base, said upper platform adapted to support a second pallet loaded with goods, wherein said second pallet fits entirely within the periphery of said upper platform;
      first and second sidewalls extending upwardly from said base and arranged generally parallel to one another, said first sidewall terminating in a first upper end and said second sidewall terminating in a second upper end, said first sidewall comprising a first vertical framework member and said second sidewall comprising a second vertical framework member, said first vertical framework member fixed to said base proximate a first peripheral corner of said base, said second vertical framework member fixed to said base proximate a second peripheral corner of said base, said first vertical framework member fixed to said upper platform proximate a first peripheral corner of said upper platform, said second vertical framework member fixed to said upper platform proximate a second peripheral corner of said upper platform;
      a bottom surface of said base that contacts said one or more rollers;
      a top of said cargo container that is open so as to not restrict the height of goods on said upper platform; and
      a side of said cargo container spanning between said first and second sidewalls that is open to allow access to goods.

2. The cargo transfer system of claim 1, wherein said bottom surface of said base is a solid plate.

3. The cargo transfer system of claim 1, wherein said bottom surface of said base comprises one or more strips that contact said one or more rollers.

4. The cargo transfer system of claim 2, wherein said first and second upper ends of said first and second sidewalls are higher than said upper platform.

5. The cargo transfer system of claim 4, wherein said first sidewall further comprises a first angled framework member that is neither vertical nor horizontal and said second sidewall further comprises a second angled framework member that is neither vertical nor horizontal, said first and second angled framework members are higher than said upper platform.

6. The cargo transfer system of claim 5, wherein said first pallet has at least one side that is at least forty inches long.

7. The cargo transfer system of claim 6, wherein the goods on said second pallet extend higher than said first and second upper ends when said second pallet loaded with goods is on said upper platform.

8. The cargo transfer system of claim 7, wherein said one or more rollers are cylindrical.

9. The cargo transfer system of claim 7, wherein said one or more rollers are spherical.

* * * * *